(12) United States Patent
Kuroyanagi et al.

(10) Patent No.: US 11,784,533 B2
(45) Date of Patent: Oct. 10, 2023

(54) DRIVE DEVICE

(71) Applicant: Nidec Corporation, Kyoto (JP)

(72) Inventors: Hitoshi Kuroyanagi, Kyoto (JP); Yuki Ishikawa, Kyoto (JP)

(73) Assignee: NIDEC CORPORATION, Kyoto (JP)

(\*) Notice: Subject to any disclaimer, the term of this patent is extended or adjusted under 35 U.S.C. 154(b) by 42 days.

(21) Appl. No.: 17/519,825

(22) Filed: Nov. 5, 2021

(65) Prior Publication Data

US 2022/0158519 A1    May 19, 2022

(30) Foreign Application Priority Data

Nov. 19, 2020   (JP) ................................. 2020-192719

(51) Int. Cl.
| | |
|---|---|
| *H02K 5/22* | (2006.01) |
| *H02K 11/33* | (2016.01) |
| *H02K 3/52* | (2006.01) |
| *B60L 15/00* | (2006.01) |

(52) U.S. Cl.
CPC ............ *H02K 5/225* (2013.01); *H02K 3/522* (2013.01); *H02K 11/33* (2016.01); *B60L 15/00* (2013.01); *H02K 2203/09* (2013.01)

(58) Field of Classification Search
CPC .......... H02K 5/22; H02K 5/225; H02K 11/30; H02K 11/33; H02K 3/522; H02K 2203/09; H02K 11/0094; H02K 5/00; H02K 3/50; H02K 3/52; B60L 50/60; B60L 2210/40; B60L 15/00; B60L 2240/52; B60L 2240/525

USPC ............................................................ 310/71
See application file for complete search history.

(56) References Cited

U.S. PATENT DOCUMENTS

| | | | |
|---|---|---|---|
| 6,166,498 A \* | 12/2000 | Yamaguchi | B60L 15/007 903/910 |
| 9,539,890 B2 \* | 1/2017 | Miyazawa | B60K 6/405 |
| 2009/0251018 A1 \* | 10/2009 | Koshida | H02K 7/1815 310/71 |
| 2017/0324300 A1 \* | 11/2017 | Yamashita | H02K 5/24 |

FOREIGN PATENT DOCUMENTS

| | | |
|---|---|---|
| JP | 2020-089171 A | 6/2020 |
| WO | 2020/179216 A1 | 9/2020 |

\* cited by examiner

*Primary Examiner* — Alexander A Singh
(74) *Attorney, Agent, or Firm* — KEATING & BENNETT (57) ABSTRACT

A drive device includes a motor, an inverter to control current supplied to the motor, plate-shaped busbars that electrically connect the motor with the inverter, and a housing that accommodates the motor, the inverter, and the busbars. The housing includes a partition wall that partitions the inside of the housing into a motor housing and an inverter housing. The partition wall is provided with a through hole. Each busbar includes a motor connection terminal, an inverter connection terminal, a first portion extending from the motor connection terminal toward the through hole, and a second portion extending from the first portion to the inverter connection terminal through the through hole. At least two busbars overlap each other in a plate thickness direction inside the through hole.

8 Claims, 5 Drawing Sheets

DRIVE DEVICE

CROSS-REFERENCE TO RELATED APPLICATIONS

The present application claims priority under 35 U.S.C. § 119 to Japanese Patent Application No. 2020-192719, filed on Nov. 19, 2020, the entire contents of which are hereby incorporated herein by reference.

FIELD OF THE INVENTION

The present disclosure relates to a drive device.

BACKGROUND

In recent years, as a drive device for an electric vehicle, a drive device including a motor and an inverter connected to the motor has been developed. In such an inverter integrated drive device, a busbar electrically connecting the motor and the inverter is passed through a hole provided at a boundary portion between the inverter case and the motor case (rotating electrical machine case).

In a vehicle drive device, a thick, large busbar is often used. Therefore, the hole of the busbar between the inverter case and the motor case is also likely to be a large opening, and it is difficult to secure a space for arranging other members such as wiring. In some drive devices in which oil is stored in the motor case, the oil in the motor case easily flows into the inverter case through the hole of the busbar.

SUMMARY

According to an example embodiment of the present disclosure, a drive device includes a motor, an inverter to control current supplied to the motor, plate-shaped busbars that electrically connect the motor with the inverter, and a housing that accommodates the motor, the inverter, and the busbars. The housing includes a partition wall that partitions an inside of the housing into a motor housing and an inverter housing. The partition wall is provided with a through hole. Each of the busbars includes a motor connection terminal located at one end, an inverter connection terminal located at another end, a first portion extending from the motor connection terminal toward the through hole, and a second portion extending from the first portion to the inverter connection terminal through the through hole. At least two of the busbars overlap each other in a plate thickness direction inside the through hole.

The above and other elements, features, steps, characteristics and advantages of the present disclosure will become more apparent from the following detailed description of the example embodiments with reference to the attached drawings.

DETAILED DESCRIPTION

Drive devices according to example embodiments of the present disclosure will be described below with reference to the drawings. Note that the scope of the present disclosure is not limited to the example embodiments described below, and any modifications can be made within the scope of the technical idea of the present disclosure.

In the following description, the direction of gravity is defined based on a positional relationship in a case where a drive device 1 is mounted in a vehicle located on a horizontal road surface. The drawings show a Y axis. The Y axis direction is a direction parallel to a motor axis J of a motor 2. The Y axis direction indicates a width direction (left-right direction) of the vehicle. Unless otherwise specified in the following description, a direction (Y axis direction) parallel to the motor axis J of the motor 2 is simply referred to as an "axial direction". In the present example embodiment, the +Y side is one side in the axial direction of the motor axis J, and the −Y side is the other side in the axial direction of the motor axis J. Furthermore, the radial direction about the motor axis J is simply referred to as "radial direction", and the circumferential direction about the motor axis J, that is, around the axis of the motor axis J is simply referred to as "circumferential direction".

Hereinafter, the drive device 1 according to an example embodiment of the present disclosure will be described.

The drive device 1 according to the present example embodiment is mounted in a motor-powered vehicle, such as a hybrid vehicle (HEV), a plug-in hybrid vehicle (PHV), and an electric vehicle (EV), and is used as the power source thereof.

Figure 1:
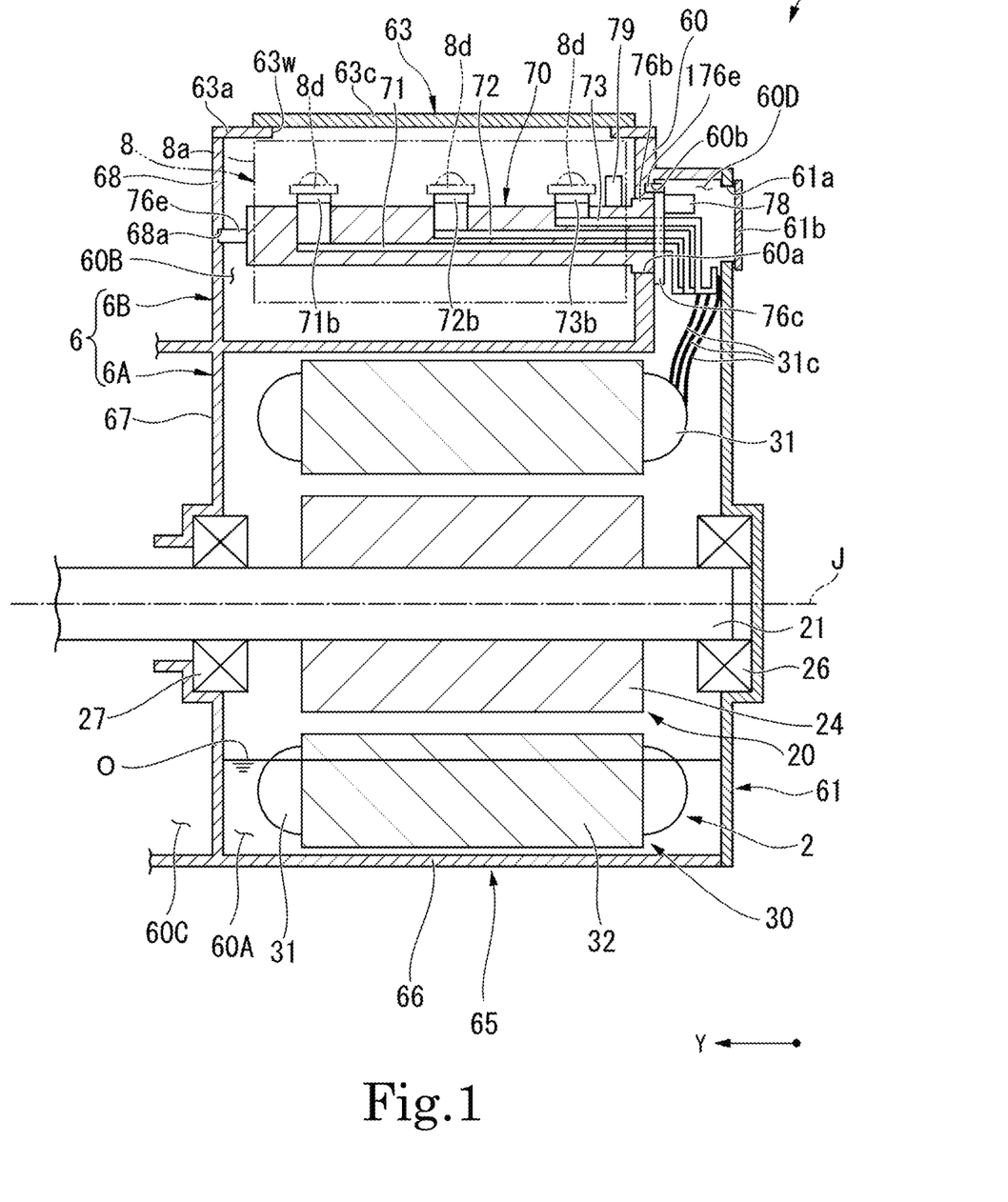
FIG. 1 is an overall schematic view of a drive device of an example embodiment of the present disclosure.

FIG. 1 is an overall schematic view of the drive device 1.

As shown in FIG. 1, the drive device 1 includes the motor 2, an inverter 8, a housing 6, a busbar assembly 70, and oil O. The drive device 1 may include a speed reduction device (not illustrated) that decelerates the rotation of the motor 2 and outputs the rotation to the outside.

The housing 6 includes a motor housing 6A that accommodates the motor 2 and an inverter housing 6B that accommodates the inverter 8. In the present example embodiment, the motor housing 6A has a motor accommodation space 60A as an internal space, and the inverter housing 6B has an inverter accommodation space 60B as an internal space. The housing 6 has a partition wall 60 that partitions the motor housing 6A and the inverter housing 6B inside the housing 6. In the case of the present example embodiment, the partition wall 60 is a side wall located at the end on the other side in the axial direction of the inverter housing 6B.

The motor 2 of the present example embodiment is a three-phase motor. The motor 2 is accommodated in the motor housing 6A. The motor 2 includes a rotor 20 that rotates about the motor axis J extending in the horizontal direction, a stator 30 located radially outside the rotor 20, and bearings 26 and 27 that rotatably support the rotor 20. The motor 2 of the present example embodiment is an inner rotor motor.

The rotor 20 rotates when an alternating current is supplied from the inverter 8 to the stator 30. The rotor 20 includes a shaft 21, a rotor core 24, and a rotor magnet (not illustrated).

The shaft 21 extends along the axial direction about the motor axis J. The shaft 21 rotates about the motor axis J. The shaft 21 is rotatably supported by the bearings 26 and 27. The bearings 26 and 27 are located on both axial sides of the shaft 21 with the rotor core 24 interposed therebetween. The bearings 26 and 27 are held by the housing 6.

The rotor core 24 is configured with stacked silicon steel plates. The rotor core 24 is a columnar body extending along the axial direction. A plurality of rotor magnets not illustrated are fixed to the rotor core 24. The plurality of rotor magnets are aligned along the circumferential direction with the magnetic poles arranged alternately.

The stator 30 includes a stator core 32, a coil 31 wound around the stator core 32, and an insulator (not illustrated) interposed between the stator core 32 and the coil 31. The stator 30 is held by the housing 6.

The stator core 32 has an annular shape about the motor axis J. The stator core 32 has a plurality of magnetic pole teeth (not illustrated) radially inward from an inner circumferential surface of an annular yoke. A coil wire is wound between the magnetic pole teeth. The coil wire wound around the magnetic pole teeth constitutes the coil 31. That is, the coil 31 is wound around the stator core 32 via the insulator.

Three connection coil wires 31$c$ corresponding to the U phase, the V phase, and the W phase extend from the end on the other side (−Y side) in the axial direction of the coil 31. The connection coil wire 31$c$ includes a coil wire, a crimp terminal not illustrated crimped to a tip of the coil wire, and an insulating tube covering an outer circumference of the coil wire. The connection coil wire 31$c$ is connected to the busbar assembly 70 at the crimp terminal located at the tip.

The housing 6 accommodates the motor 2, the inverter 8, the oil O, and the busbar assembly 70. In the housing 6, the motor housing 6A has the motor accommodation space 60A that accommodates the motor 2 and the oil O. The inverter housing 6B has the inverter accommodation space 60B that accommodates the inverter 8. In the case of the present example embodiment, the inverter accommodation space 60B is located radially outside the motor 2. The partition wall 60 partitions the internal space of the housing 6 into the motor accommodation space 60A and the inverter accommodation space 60B.

The oil O accumulates in a lower region of the motor accommodation space 60A. The oil O is cooled by an oil cooler not illustrated. The oil O circulates in an oil passage provided in the housing 6 by a pump not illustrated, and is supplied to the motor 2 from above. Thus, the oil O cools the motor 2.

Although not illustrated in detail, a gear accommodation space 60C is further provided inside the housing 6. That is, the housing 6 may include a gear housing having the gear accommodation space 60C. The gear accommodation space 60C is located on one side (+Y side) in the axial direction of the motor accommodation space 60A A. A plurality of gears (not illustrated) are arranged in the gear accommodation space 60C. Each gear is connected to the shaft 21, constitutes a speed reduction mechanism, and outputs power of the motor 2 from an output shaft (not illustrated). The gear accommodation space 60C may be a space continuous with the motor accommodation space 60A. In this case, the oil O flows also into the gear accommodation space 60C and functions as lubricating oil for lubricating each gear in the gear accommodation space 60C.

The housing 6 includes a housing body 65, a motor cover 61, and an inverter cover 63. The housing body 65, the motor cover 61, and the inverter cover 63 are made of, for example, aluminum die-casting.

The housing body 65 includes a tubular portion 66 extending along the motor axis J, a bottom portion 67 located at an end on the other side (−Y side) in the axial direction of the tubular portion 66, and a box-like portion 68 disposed on the radially outside the tubular portion 66. In the present example embodiment, the tubular portion 66 and the bottom portion 67 constitute the motor housing 6A, and the box-like portion 68 constitutes the inverter housing 6B.

The tubular portion 66 opens to the other side (−Y side) in the axial direction. The opening of the tubular portion 66 is closed by the motor cover 61. The motor cover 61 is opposed to the bottom portion 67 in the axial direction. The bottom portion 67 and the motor cover 61 support the shaft 21 via the bearings 26 and 27. The motor accommodation space 60A is a space surrounded by the tubular portion 66, the bottom portion 67, and the motor cover 61.

The housing 6 has an expansion space 60D that expands radially outside (upper side in FIG. 1) at an end on the other side (−Y side) in the axial direction of the motor accommodation space 60A. The expansion space 60D is a space located on the other side in the axial direction of the inverter housing 6B and located axially between the inverter housing 6B and the motor cover 61. The expansion space 60D is a part of the motor accommodation space 60A. A part of the busbar assembly 70 is arranged in the expansion space 60D.

The partition wall 60 is located between the expansion space 60D and the inverter accommodation space 60B. The partition wall 60 extends along a plane orthogonal to the motor axis J. The partition wall 60 has a through hole 60$a$ axially penetrating the partition wall 60. The through hole 60$a$ connects the expansion space 60D (i.e., the motor accommodation space 60A) with the inverter accommodation space 60B. The busbar assembly 70 is inserted into the through hole 60$a$.

The box-like portion 68 opens upward. The opening of the box-like portion 68 is closed by the inverter cover 63. The inverter housing 6B includes the box-like portion 68 and the inverter cover 63. The inverter accommodation space 60B is a space surrounded by the box-like portion 68 and the inverter cover 63.

The inverter cover 63 has a top plate portion 63$a$ extending along the horizontal direction. The top plate portion 63$a$ covers the inverter accommodation space 60B from above. The top plate portion 63$a$ has a window portion 63$w$ penetrating the top plate portion 63$a$ in the vertical direction. The window portion 63$w$ is closed by a lid 63$c$. The lid 63$c$ is attachable to and detachable from the top plate portion 63$a$. Immediately below the window portion 63$w$, a connection portion between a plurality of inverter busbars 8$d$ described later, and a first busbar 71, a second busbar 72, and a third busbar 73 is disposed.

The inverter 8 is fixed to a rear surface of the top plate portion 63$a$ of the inverter cover 63. The inverter 8 is electrically connected to the motor 2 via the busbar assembly 70 and a second busbar assembly 77. The inverter 8 controls the current supplied to the motor 2. The inverter 8 may be fixed to the box-like portion 68.

The inverter 8 includes an inverter body 8$a$ and three inverter busbars 8$d$ extending from the inverter body 8$a$. That is, the drive device 1 includes the inverter busbars 8$d$. The inverter body 8$a$ has, for example, a power substrate, a capacitor, a switching element, and the like, and converts a direct current supplied from a battery not illustrated into an alternating current. The three inverter busbars 8*d* are respectively connected to the first busbar 71, the second busbar 72, and the third busbar 73 of the busbar assembly 70 in the inverter accommodation space 60B.

The busbar assembly 70 is inserted into the through hole 60*a* of the partition wall 60. The busbar assembly 70 is fixed to the partition wall 60. The busbar assembly 70 includes the first busbar 71, the second busbar 72, and the third busbar 73 that pass through the through hole 60*a*. The first busbar 71, the second busbar 72, and the third busbar 73 are respectively connected to the three connection coil wires 31*c* extending from the coil 31. Each of the first busbar 71, the second busbar 72, and the third busbar 73 is connected to the inverter 8 in the inverter accommodation space 60B. That is, the first busbar 71, the second busbar 72, and the third busbar 73 electrically connect the motor 2 with the inverter 8.

Figure 2:
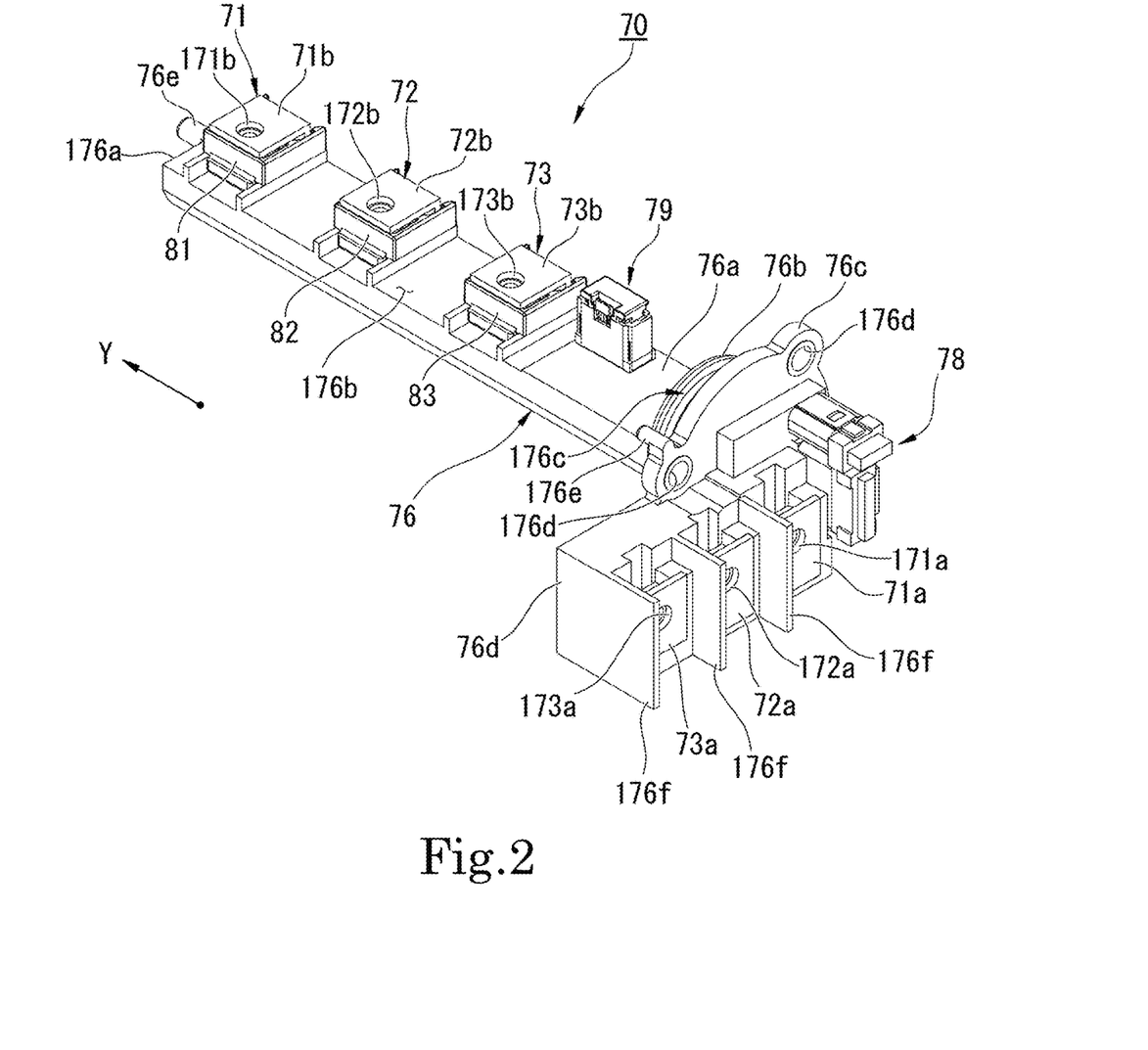
FIG. 2 is a perspective view of a busbar assembly of an example embodiment of the present disclosure.
Figure 3:
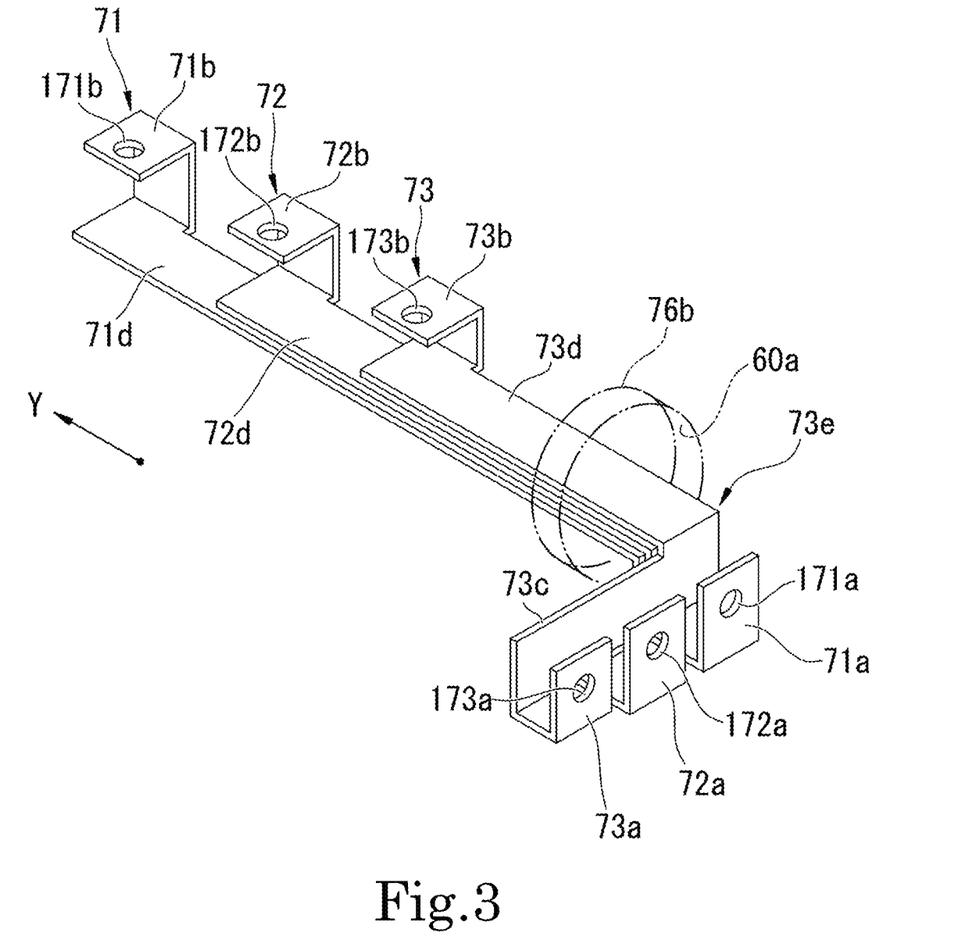
FIG. 3 is a perspective view of three busbars of an example embodiment of the present disclosure.
Figure 4:
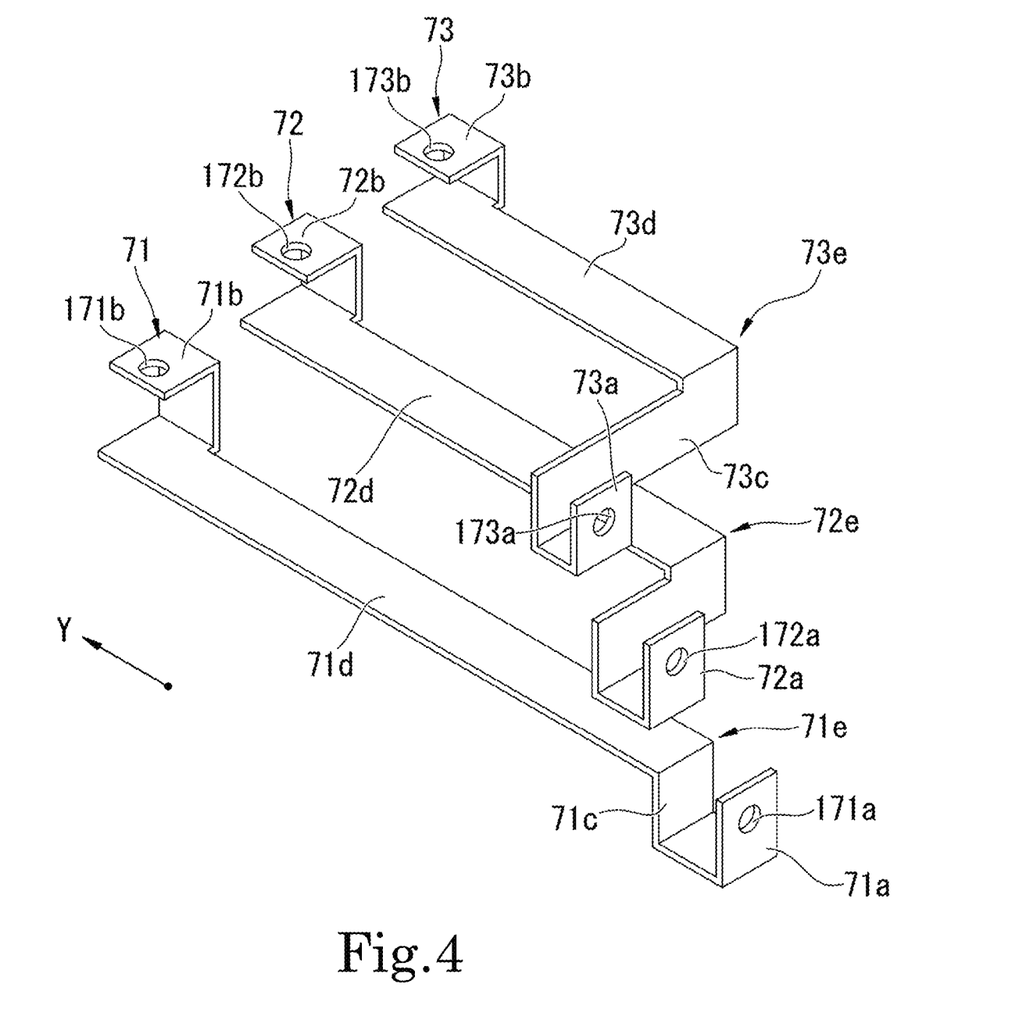
FIG. 4 is a perspective view presenting three busbars of an example embodiment of the present disclosure shifted in a plate thickness direction.

FIG. 2 is a perspective view of the busbar assembly 70. FIG. 3 is a perspective view of the three busbars. FIG. 4 is a perspective view presenting the three busbars shifted in a plate thickness direction.

As shown in FIG. 2, the busbar assembly 70 includes the first busbar 71, the second busbar 72, the third busbar 73, a busbar holder 76, a first connector 78, and a second connector 79.

As shown in FIGS. 3 and 4, the first busbar 71, the second busbar 72, and the third busbar 73 are made of plate-shaped conductors. The first busbar 71, the second busbar 72, and the third busbar 73 electrically connect the motor 2 with the inverter 8. The first busbar 71, the second busbar 72, and the third busbar 73 flow an alternating current having a different phase at every 120° in correspondence to the U phase, the V phase, and the W phase, respectively.

The first busbar 71 includes a motor connection terminal 71*a* located at one end, an inverter connection terminal 71*b* located at the other end, a first portion 71*c* extending from the motor connection terminal 71*a* toward the through hole 60*a*, and a second portion 71*d* extending from the first portion 71*c* to the inverter connection terminal 71*b* through the through hole 60*a*. The first portion 71*c* and the second portion 71*d* are connected via a bent portion 71*e*.

Similarly to the first busbar 71, the second busbar 72 includes a motor connection terminal 72*a*, an inverter connection terminal 72*b*, a first portion 72*c*, and a second portion 72*d*. The first portion 72*c* and the second portion 72*d* are connected via a bent portion 72*e*.

Similarly to the first busbar 71, the third busbar 73 includes a motor connection terminal 73*a*, an inverter connection terminal 73*b*, a first portion 73*c*, and a second portion 73*d*. The first portion 73*c* and the second portion 73*d* are connected via a bent portion 73*e*.

The motor connection terminals 71*a*, 72*a*, and 73*a* are L-like parts located at ends on the other side (−Y side) in the axial direction of the first busbar 71, the second busbar 72, and the third busbar 73, respectively. The motor connection terminals 71*a*, 72*a*, and 73*a* have, at tips thereof, through holes 171*a*, 172*a*, and 173*a*, respectively, through which bolts for fixing the connection coil wire 31*c* pass.

The inverter connection terminals 71*b*, 72*b*, and 73*b* are L-like parts located at ends on one side (+Y side) in the axial direction of the first busbar 71, the second busbar 72, and the third busbar 73, respectively. The inverter connection terminals 71*b*, 72*b*, and 73*b* have, at tips thereof, through holes 171*b*, 172*b*, and 173*b*, respectively, through which bolts for fixing the inverter busbar 8*d* pass.

The busbar holder 76 is made of an insulating resin material. The busbar holder 76 includes a pillar-like first holder portion 76*a* extending along the axial direction, a disk-like sealing portion 76*b* located at an end on the other side (−Y side) in the axial direction of the first holder portion 76*a*, a flange portion 76*c* located on the other side in the axial direction of the sealing portion 76*b*, and a second holder portion 76*d* located on the other side in the axial direction of the flange portion 76*c* and extending in a direction intersecting the axial direction.

The second portions 71*d*, 72*d*, and 73*d* of the first busbar 71, the second busbar 72, and the third busbar 73 are embedded in the first holder portion 76*a*. The first holder portion 76*a* is disposed in the inverter housing 6B.

The first holder portion 76*a* has an end surface 176*a* facing one side (+Y side) in the axial direction and an outer circumferential surface 176*b* facing a direction orthogonal to the axial direction. The busbar holder 76 has a columnar projection 76*e* protruding from the end surface 176*a* to one side in the axial direction. Of the outer circumferential surface 176*b*, the upper surface and the side surface are substantially flat surfaces, and the lower surface is an arc-like curved surface when viewed from the axial direction. Since a part of the outer circumferential surface 176*b* has a curved surface shape, it is possible to secure the volume while preventing the diameter of the first holder portion 76*a* from increasing. This makes it easy to ensure insulation of the busbars embedded in the first holder portion 76*a*.

The inverter connection terminal 71*b* of the first busbar 71, the inverter connection terminal 72*b* of the second busbar 72, and the inverter connection terminal 73*b* of the third busbar 73 are disposed on the upper surface of the first holder portion 76*a*. As shown in FIG. 2, the inverter connection terminals 71*b*, 72*b*, and 73*b* are disposed at positions separated from one another in the axial direction. As a result, the busbars are well insulated from one another in the inverter accommodation space 60B. In the case of the present example embodiment, the interval between the inverter connection terminals 71*b*, 72*b*, and 73*b* is larger than the axial width of the inverter connection terminals 71*b*, 72*b*, and 73*b*.

Each of the inverter connection terminals 71*b*, 72*b*, and 73*b* protrudes upward from the upper surface of the first holder portion 76*a*. Portions of the L-like inverter connection terminals 71*b*, 72*b*, and 73*b* on the more tip end side than the bent portions are opposed to the upper surface of the first holder portion 76*a* in the vertical direction. The through holes 171*b*, 172*b*, and 173*b* of the inverter connection terminals 71*b*, 72*b*, and 73*b* each opens in the vertical direction. Nut components 81, 82, and 83 are respectively disposed between the through holes 171*b*, 172*b*, and 173*b* and the upper surface of the first holder portion 76*a*.

In the busbar assembly 70, the through hole 171*b* overlaps the second portion 71*d* in the plate thickness direction. The through hole 172*b* overlaps the second portion 72*d* in the plate thickness direction. The through hole 173*b* overlaps the second portion 73*d* in the plate thickness direction. According to this configuration, the inverter connection terminals 71*b*, 72*b*, and 73*b* and the second portions 71*d*, 72*d*, and 73*d* can be stored within a range of a narrow horizontal width, when viewed from the axial direction. This can reduce the size of the through hole 60*a*.

The second connector 79 is disposed on the upper surface of the first holder portion 76*a*. The second connector 79 is located between the inverter connection terminal 73*b* and the sealing portion 76*b*. The second connector 79 may be disposed at another position. For example, the second connector 79 may be disposed at an end on one side (+Y side)

in the axial direction of the first holder portion 76a, or may be disposed among the inverter connection terminals 71b, 72b, and 73b. Alternatively, the second connector 79 may be disposed on a side surface or a lower surface of the first holder portion 76a.

The sealing portion 76b has a disk shape expanding radially outward of the first holder portion 76a from an end on the other side (−Y side) in the axial direction of the first holder portion 76a. The sealing portion 76b has a groove 176c extending over the entire outer circumferential surface. An O-ring not illustrated is disposed in the groove 176c. As shown in FIG. 1, the sealing portion 76b is disposed in the through hole 60a of the partition wall 60 in a state where the busbar assembly 70 is attached to the housing 6. The O-ring held in the groove 176c is brought into close contact with the inner circumferential surface of the through hole 60a, whereby the through hole 60a is sealed. The sealing structure of the through hole 60a is not limited to the sealing structure by the sealing portion 76b. For example, the O-ring may be disposed on a surface of the flange portion 76c facing one side (+Y side) in the axial direction, and sealing may be provided between the partition wall 60 and the flange portion 76c.

The flange portion 76c protrudes to the outside of the sealing portion 76b along a plane orthogonal to the axial direction from an end edge on the other side in the axial direction of the sealing portion 76b. The flange portion 76c extends outward relative to the sealing portion 76b over the entire circumference of the sealing portion 76b. The flange portion 76c includes a plurality of fixing holes 176d axially penetrating the flange portion 76c, and an axially extending projection 176e located at an outer circumferential end of the flange portion 76c. A fixing screw (not illustrated) for fixing the busbar assembly 70 to the partition wall 60 passes through the fixing hole 176d. The projection 176e protrudes to the one side in the axial direction relative to a surface of the flange portion 76c facing the one side in the axial direction (+Y side). The projection 176e may exist at a position other than the outer circumferential end of the flange portion 76c.

The second holder portion 76d is a substantially quadrangular prism-like portion extending from the flange portion 76c in the direction intersecting the axial direction. The second holder portion 76d internally holds the first portions 71c, 72c, and 73c on the other side (−Y side) in the axial direction of the first busbar 71, the second busbar 72, and the third busbar 73. The motor connection terminal 71a of the first busbar 71, the motor connection terminal 72a of the second busbar 72, and the motor connection terminal 73a of the third busbar 73 are disposed on a surface of the second holder portion 76d facing the other side in the axial direction.

The motor connection terminals 71a, 72a, and 73a are aligned in the horizontal direction when viewed from the axial direction. The second holder portion 76d has three partition walls 176f protruding from a surface facing the other side (−Y side) in the axial direction of the second holder portion 76d to the other side in the axial direction. The three partition walls 176f are arranged at intervals with one another in the direction in which the second holder portion 76d extends. The motor connection terminals 72a and 73a are disposed between the partition walls 176f next to each other. Regarding the motor connection terminal 71a, the partition wall 176f is disposed only on one side of the motor connection terminal 71a.

The first connector 78 is disposed on a surface facing the other side (−Y side) in the axial direction of the flange portion 76c. In the case of the present example embodiment, on the surface of the flange portion 76c facing the other side in the axial direction, the second holder portion 76d and the first connector 78 are aligned in the horizontal direction when viewed from the axial direction. The first connector 78 is next to the motor connection terminal 71a held by the second holder portion 76d. That is, the motor connection terminal 71a is located between the partition wall 176f and the first connector 78.

The first connector 78 and the second connector 79 are electrically connected via wiring embedded in the busbar holder 76. Wiring connecting the first connector 78 with the second connector 79 passes through the inside of the flange portion 76c, the sealing portion 76b, and the first holder portion 76a. That is, the wiring connecting the first connector 78 with the second connector 79 passes through the through hole 60a of the partition wall 60. This configuration makes it possible to connect the first connector 78 with the second connector 79 without separately providing the partition wall 60 with a through hole for wiring. Since the wiring connecting the first connector 78 with the second connector 79 is embedded in the busbar holder 76, the busbar can be handled as the single busbar assembly 70 together with the first busbar 71, the second busbar 72, and the third busbar 73. This configuration facilitates installation to the housing 6. Since the first connector 78 and the second connector 79 are fixed to the busbar holder 76, connector connection to the first connector 78 and the second connector 79 also becomes easy.

The busbar assembly 70 is fixed in a state where the first holder portion 76a side faces one side (+Y side) in the axial direction and the second holder portion 76d side faces the other side (−Y side) in the axial direction.

As shown in FIG. 1, the busbar assembly 70 is inserted into the through hole 60a of the partition wall 60 from the expansion space 60D (motor accommodation space 60A) toward the inverter accommodation space 60B. When the assembly worker inserts the busbar assembly 70 into the through hole 60a, the sealing portion 76b of the busbar holder 76 is inserted into the through hole 60a, and the gap between the inner circumferential surface of the through hole 60a and the outer circumferential surface of the sealing portion 76b is sealed by the O-ring provided in the sealing portion 76b.

The busbar assembly 70 is fastened and fixed to the partition wall 60 by a fixing screw passing through the fixing hole 176d at a position where a surface of the flange portion 76c facing one side in the axial direction is in contact with a surface of the partition wall 60 facing the other side in the axial direction. In the case of the present example embodiment, the O-ring provided in the sealing portion 76b functions as a member for fixing the busbar holder 76 to the through hole 60a. Therefore, the busbar holder 76 of the present example embodiment has a first fixing portion fixed to the partition wall 60 or the through hole 60a at a portion close to the other side in the axial direction.

The busbar holder 76 has the projection 76e at a tip end of the first holder portion 76a. As shown in FIG. 1, the projection 76e is inserted into a fitting hole 68a provided on the inner surface of the side wall of the inverter housing 6B. Due to the fitting structure of the projection 76e and the fitting hole 68a, the end on one side in the axial direction of the busbar assembly 70 is fixed to the inverter housing 6B. That is, the busbar holder 76 has a second fixing portion located at a tip end in an insertion direction into the through hole 60a and is fixed to the inverter housing 6B. A fitting hole may be provided at a tip end on one side in the axial direction of the busbar holder, and a projection may be provided on a side wall of the inverter housing 6B. In the present example embodiment, the second fixing portion of the busbar holder 76 is located at a position different from the first fixing portion.

In a state where the busbar holder 76 is fixed to the inverter housing 6B by the first fixing portion and the second fixing portion, the inverter connection terminals 71b, 72b, and 73b of the busbar assembly 70 are bolted to the inverter busbar 8d of the inverter 8.

Since the busbar holder 76 has the first fixing portion and the second fixing portion, the busbar holder 76 is fixed to the inverter housing 6B at two positions in the axial direction. This can stably fix the busbar holder 76 to the housing 6. It is possible to suppress vibration of the busbar assembly 70 and also possible to suppress noise due to vibration.

The busbar holder 76 has the projection 176e on an outer circumferential end of the flange portion 76c, the projection 176e protruding to one side in the axial direction from a surface on one side (+Y side) in the axial direction of the flange portion 76c. By inserting the busbar assembly 70 into the through hole 60a, the projection 176e is inserted into a fitting hole 60b opening on the surface facing the other side (−Y side) in the axial direction of the partition wall 60. The busbar holder 76 is fixed to the partition wall 60 by the fitting structure of the projection 176e and the fitting hole 60b. The flange portion 76c may be provided with a fitting hole, and the partition wall 60 may be provided with a projection. That is, the first fixing portion of the busbar holder 76 has the projection 176e constituting the fitting structure with the fitting hole 60b of the partition wall 60 or the fitting hole constituting the fitting structure with the projection of the partition wall 60.

According to the above configuration, the flange portion 76c and the partition wall 60 can be easily fixed when the busbar assembly 70 is inserted into the through hole 60a. Since the busbar holder 76 can be positioned in the circumferential direction, the inverter connection terminals 71b, 72b, and 73b in the inverter housing 6B can be easily positioned with the inverter busbar 8d of the inverter 8. Since the fixing hole 176d and the screw hole of the partition wall 60 are aligned, it becomes easy to screw the flange portion 76c.

In the busbar assembly 70, the first busbar 71, the second busbar 72, and the third busbar 73 are embedded in the busbar holder 76 in a state of being overlapped in a row in the vertical direction shown in FIG. 3. Specifically, the second portions 71d, 72d, and 73d are embedded in the first holder portion 76a, the sealing portion 76b, and the flange portion 76c in a state where the second portions 71d, 72d, and 73d overlap one another in a row in the plate thickness direction and are aligned in the vertical direction.

With this configuration, since the busbars are arranged to overlap one another in the plate thickness direction at the position of the sealing portion 76b disposed in the through hole 60a, the width in the horizontal direction when viewed from the axial direction can be brought into a width of substantially one busbar as a whole for the first busbar 71, the second busbar 72, and the third busbar 73.

Since this can reduce the diameter of the through hole 60a, it becomes easy to secure a space around the through hole 60a, and it becomes easy to install other wirings or components. Furthermore, since the space inside the housing 6 can be efficiently used, the drive device 1 can be easily downsized. In addition, since the through hole 60a can be made small, the sealing length of the inner circumferential surface of the through hole 60a is shortened, and the oil O hardly flows from the motor housing 6A into the inverter housing 6B.

In the case of the present example embodiment, the first portions 71c, 72c, and 73c are also embedded in the second holder portion 76d in a state of being overlapped in a row in the plate thickness direction and aligned in the axial direction. Since this configuration can reduce the size of the second holder portion 76d when viewed from the axial direction, it becomes easy to install other wirings or components in the expansion space 60D. The space in the housing 6 can be efficiently used, and the drive device 1 can be easily downsized.

In the busbar assembly 70, in the through hole 60a, the interval between the first busbar 71 and the second busbar 72 and the interval between the second busbar 72 and the third busbar 73 in the plate thickness direction are smaller than the widths of the first busbar 71, the second busbar 72, and the third busbar 73. According to this configuration, the intervals between the first busbar 71, the second busbar 72, and the third busbar 73 can be reduced in the vertical direction. The diameter of the through hole 60a can be reduced. In the present example embodiment, the interval between the first busbar 71 and the second busbar 72 and the interval between the second busbar 72 and the third busbar 73 in the plate thickness direction are substantially the same as the plate thicknesses of the first busbar 71, the second busbar 72, and the third busbar 73.

In the busbar assembly 70, the first busbar 71, the second busbar 72, and the third busbar 73 have the bent portions 71e, 72e, and 73e, respectively. The second portions 71d, 72d, and 73d extend along the axial direction. On the other hand, the first portions 71c, 72c, and 73c extend in a direction orthogonal to the axial direction.

According to this configuration, the busbar assembly 70 is less likely to increase in size in both the axial direction and the direction orthogonal to the axial direction, and can be disposed in a narrow region in the housing 6. In the configuration in which the inverter 8 is disposed in the radial direction of the motor 2, the connection coil wire 31c extending from the coil 31 and the motor connection terminals 71a, 72a, and 73a can be easily connected, and the inverter connection terminals 71b, 72b, and 73b and the inverter busbar 8d can be disposed so as to be easily connected also in the inverter housing 6B. The bent portions 71e, 72e, and 73e are not limited to right angles, and are only required to be bent at any angle. The direction in which the first portions 71c, 72c, and 73c extend and the direction in which the second portions 71d, 72d, and 73d extend are not limited to the configuration of the example embodiment. For example, the first portions 71c, 72c, and 73c may extend along the axial direction, and the second portions 71d, 72d, and 73d may extend in a direction orthogonal to the axial direction.

In the busbar assembly 70, as shown in FIG. 3, the motor connection terminal 73a of the third busbar 73 is located farther than the motor connection terminal 72a of the second busbar 72 with respect to the through hole 60a, and the inverter connection terminal 73b of the third busbar 73 is located closer than the inverter connection terminal 72b of the second busbar 72 with respect to the through hole 60a.

Similarly, the motor connection terminal 72a of the second busbar 72 is located farther than the motor connection terminal 71a of the first busbar 71 with respect to the through hole 60a, and the inverter connection terminal 72b of the second busbar 72 is located closer than the inverter connection terminal 71*b* of the first busbar 71 with respect to the through hole 60*a*.

According to these configurations, the lengths of the first busbar 71, the second busbar 72, and the third busbar 73 can be brought close to each other. Since the difference in length among the plurality of busbars becomes small, variation in electrical characteristics among the busbars can be suppressed.

In the present example embodiment, the three second portions 71*d*, 72*d*, and 73*d* are aligned in the vertical direction. However, as long as the three second portions 71*d*, 72*d*, and 73*d* overlap in the plate thickness direction, the array direction viewed from the axial direction is not particularly limited. For example, the three second portions 71*d*, 72*d*, and 73*d* may be aligned in the horizontal direction when viewed from the axial direction, or may be aligned in a direction oblique to the horizontal direction and the vertical direction.

In the present example embodiment, the three second portions 71*d*, 72*d*, and 73*d* are aligned to overlap in a row in the plate thickness direction inside the through hole 60*a*. However, the present disclosure is not limited to this configuration.

For example, only the two second portions 71*d* and 72*d* may be disposed to overlap each other in the plate thickness direction, and the remaining one second portion 73*d* may be disposed at a position not overlapping the second portions 71*d* and 72*d* in the plate thickness direction. In this case, although the opening diameter of the through hole 60*a* becomes slightly larger, since the two second portions 71*d* and 72*d* are arranged to overlap each other in the plate thickness direction, the opening diameter can be made smaller than that of a hole through which a conventional busbar passes.

Figure 5:
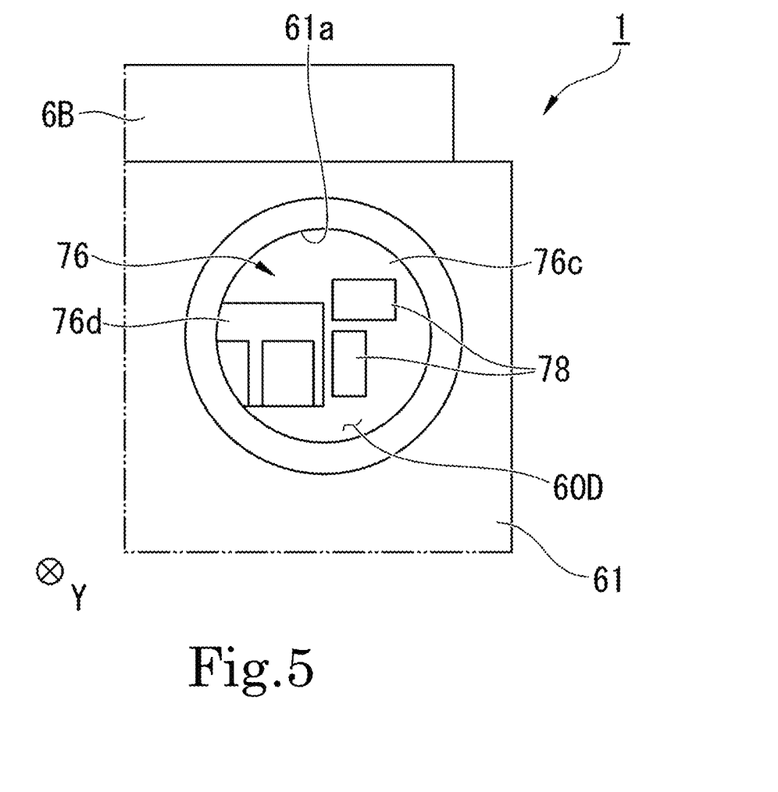
FIG. 5 is an explanatory view showing a motor cover and an operation window of an example embodiment of the present disclosure.

As shown in FIG. 1, in the drive device 1, the motor housing 6A has the motor cover 61 separate from a portion (housing body 65) including the partition wall 60. As shown in FIGS. 1 and 5, the motor cover 61 has an operation window 61*a* opening at a position where the first connector 78 of the busbar holder 76 can be operated. As shown in FIG. 1, the operation window 61*a* is closed from the outside by a lid 61*b*. The lid 61*b* can be attached to and detached from the operation window 61*a*. The lid 61*b* is fixed to the operation window 61*a* by, for example, screwing.

The operation window 61*a* opens at a position where the first connector 78 can be operated in a state where the lid 61*b* is removed. That is, the worker can perform connector connection to the first connector 78 by inserting a finger or a tool into the expansion space 60D from the operation window 61*a*. Since the motor cover 61 has the operation window 61*a*, wiring work can be performed in a state where the motor cover 61 is attached to the motor housing 6A. It becomes easy to perform the work of connecting the wiring extending from a component located on the inner surface of the motor cover 61 to the first connector 78.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a motor;
   an inverter to control current supplied to the motor;
   plate-shaped busbars that electrically connect the motor with the inverter; and
   a housing that accommodates the motor, the inverter, and the busbars; wherein
   the housing includes a partition wall that partitions an inside of the housing into a motor housing and an inverter housing;
   the partition wall is provided with a through hole;
   each of the busbars includes:
      a motor connection terminal located at one end;
      an inverter connection terminal located at another end;
      a first portion extending from the motor connection terminal toward the through hole; and
      a second portion extending from the first portion to the inverter connection terminal through the through hole;
   at least two of the busbars overlap each other in a plate thickness direction inside the through hole; and
   an interval between the busbars overlapping each other in the plate thickness direction is smaller than a width of the busbars.

2. The drive device according to claim 1, wherein the busbars overlap each other in a row in the plate thickness direction inside the through hole.

3. The drive device according to claim 1, wherein the busbars include a bent portion at a boundary between the first portion and the second portion; and
the first portion of the busbars and the second portion of the busbars extend in different directions from each other.

4. The drive device according to claim 1, wherein the busbars include a first one of the busbars and a second one of the busbars overlapping each other in the plate thickness direction inside the through hole;
the motor connection terminal of the first busbar is located farther than the motor connection terminal of the second busbar with respect to the through hole; and
the inverter connection terminal of the first busbar is located closer than the inverter connection terminal of the second busbar with respect to the through hole.

5. The drive device according to claim 1, further comprising:
a busbar holder that holds the busbars; wherein
the busbar holder includes:
   a first fixing portion fixed to the through hole or the partition wall; and
   a second fixing portion located at a position different from the first fixing portion and fixed to the inverter housing; and
the second fixing portion includes a projection or a fitting hole defining a fitting structure with a fitting hole or a projection of the inverter housing.

6. The drive device according to claim 5, wherein the first fixing portion includes a projection or a fitting hole defining a fitting structure with a fitting hole or a projection of the partition wall.

7. The drive device according to claim 1 further comprising:
a busbar holder that holds the busbars; wherein
the busbar holder includes:
a first connector located in the motor housing;
a second connector located in the inverter housing; and
a wiring electrically connecting the first connector with the second connector through the through hole.

8. The drive device according to claim 7, wherein the motor housing includes a motor cover separate from a portion including the partition wall; and the motor cover includes an operation window opening at a position where the first connector of the busbar holder can be accessed and operated.

\* \* \* \* \*